United States Patent [19]

Coast et al.

[11] 4,046,630

[45] Sept. 6, 1977

[54] PROCESS PLANT

[75] Inventors: Geoffrey Coast, Northwich; Ronald Francis Briody, Wigan, both of England

[73] Assignee: United Kingdom Atomic Energy Authority, London, England

[21] Appl. No.: 680,227

[22] Filed: Apr. 26, 1976

[30] Foreign Application Priority Data

May 15, 1975 United Kingdom ............... 20744/75

[51] Int. Cl.² ............................................. G21D 9/00
[52] U.S. Cl. .................................. 176/39; 23/288 K; 23/288 M
[58] Field of Search .......... 176/39; 23/288 K, 288 M; 423/651; 252/373; 48/61, 197 R

[56] References Cited

U.S. PATENT DOCUMENTS

| 2,986,454 | 5/1961 | Jewett | 23/288 K X |
|---|---|---|---|
| 3,802,993 | 4/1974 | von Fredersdorff | 176/39 X |
| 3,899,420 | 8/1975 | Nozawa et al. | 23/288 M X |
| 3,923,466 | 12/1975 | Seelig et al. | 23/288 K X |
| 3,972,688 | 8/1976 | Cornelius et al. | 176/39 X |

OTHER PUBLICATIONS

Perry's Chem. Eng'rs' Handbook, Perry et al., McGraw-Hill Book Co., N.Y., N.Y., 4th Ed., 1963, pp. 6-64.

Primary Examiner—Peter A. Nelson
Attorney, Agent, or Firm—Larson, Taylor and Hinds

[57] ABSTRACT

To supply process heat to a number of discrete reaction zones typically of a methane reformer plant, the hot gas from a nuclear reactor is employed. The reaction zones are defined within the bores of process tubes and heat is applied by way of gas conduits co-axial with the tubes. The reactants and heating gas are passed in counter current from header pipes which are coupled to the process tubes by flexible pipes. The latter are crushable to isolate any particular process tube, eg for replacement of catalysts etc.

6 Claims, 2 Drawing Figures

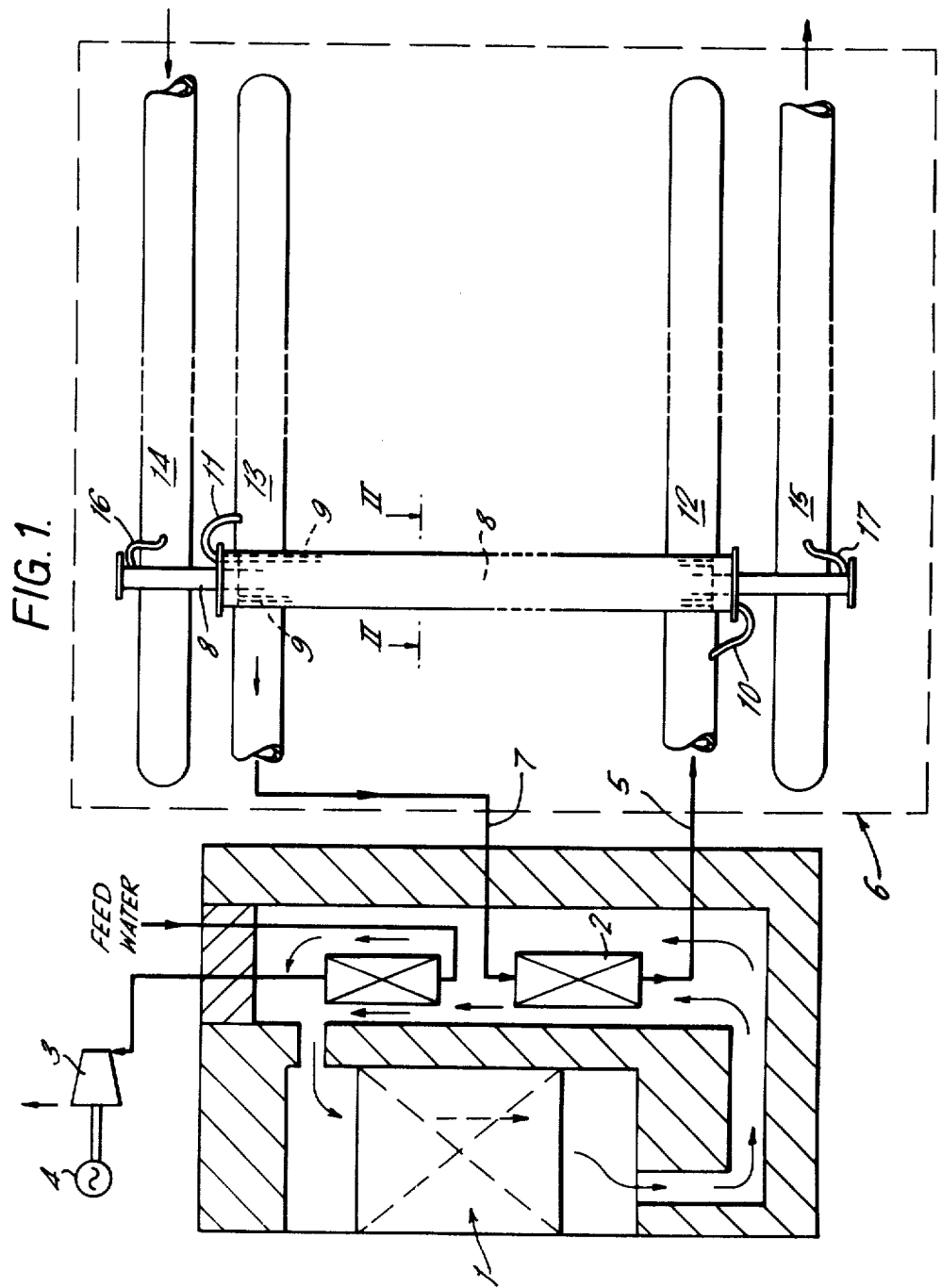

PROCESS PLANT

BACKGROUND OF THE INVENTION

This invention relates to a process plant utilising the heat produced by a nuclear reactor in an endothermic chemical process and aims to provide an improved plant layout. One such process is an endothermic reformer process, such as methane/steam reforming to produce hydrogen for example. Advantage is seen in using the high temperature gas from a HTGC reactor to supply process heat. Difficulties arise however in absorbing the substantial amount of heat, produced centrally in the reactor in the characteristically dispersed process zones of the process plant being supplied.

SUMMARY OF THE INVENTION

According to the invention a process plant for coupling to a high temperature gas cooled nuclear reactor serving as a central heat source for the supply of process heat includes at least one bank of parallel process tubes, each tube defining therewith a reaction zone for endothermic chemical reactions, conduits for hot gas surrounding the process tubes for heating the tubes, at first a pair of header pipes respectively connected to supply reactants to one end of each of the process tubes and to accept reacted products from the other end of each of the process tubes and a second pair of header pipes connected respectively to supply heating gas to one end of each of the conduits and to receive said gas from the other end of each of the conduits. Preferably the hot gas conduits are formed by an annular row of holes in the wall of catalyst-containing process tubes. The respective header pipes may be connected to the process tubes and to the gas conduits by flexible connectors such as small diameter pipes. The flexible connectors may be made easily crushable to form a seal so to isolate any selected tube for subsequent replacement of the process tube and/or its catalyst.

DESCRIPTION OF THE DRAWING(S)

In order that the invention may be better understood a description of a process plant embodying the invention will now be given with reference to FIGS. 1 and 2 of the drawing in which FIG. 1 is a diagram showing the general arrangement of one module of a reforming plant employing nuclear heat and FIG. 2 shows a reformer tube in cross-section in a plane normal to the tube axis.

DESCRIPTION OF THE PREFERRED EMBODIMENT

As shown in FIG. 1 a high temperature gas cooled nuclear reactor 1 has least one pair of secondary heat exchange circuits, one of the pair is a secondary helium circuit heat exchanger 2 for reformer process heat, the other, water for raising steam for a steam turbine 3 driving an alternator 4. A duct 5 leads hot helium to a methane/steam reformer plant 6 at about 850° C and 50 bar pressure. A duct 7 returns cooled helium to heat exchanger 2. The Figure shows one module only of the plant associated with one circuit 2, in practice there will be sufficient of these circuits to absorb the high grade heat output from the nuclear reactor. Each module comprises a bank of aligned, vertically supported catalyst-containing reformer process tubes 8; each tube 8 is individually heated by its surrounding hot gas conduit which takes the form of an annular row of holes 9 in the tube wall. (FIG. 2) The holes 9 are supplied with hot helium by connectors 10 from a header pipe 12 which is one of a first pair of such pipes which extends horizontally, at a low level along the module. The cooled helium passes from the upper ends of the holes 9 into an outlet header pipe 13 which is the other of the first pair of such pipes via similar connectors II whence it returns to duct 7 and the nuclear reactor heat exchanger 2. A second set of header pipes is supported horizontally alongside the tubes 8 to lead reactants to the tubes 8 and take the reacted and reformed products. These are the upper horizontal header 14 and the lower horizontal header 15. Methane/steam in admixture are fed into one end of header 14, the other end of which is closed. Connectors 16 arranged in parallel supply each tube 8 with these reactants which pass down the tube bores over the catalyst. Under the action of the high temperature, the reactants reform into hydrogen and carbon dioxide, a mixture of which pass into the lower horizontal header 15 via connectors 17. A recuperator is preferably employed to effect heat exchange between the reactants and the reformed products.

The connectors 10, 11, 16, 17 are short flexible spiral pipes and can safely distort under high temperature. Moreover should a catalyst-containing tube become defective, its four associated connectors may be sealed by crushing. At some later convenient time the connectors may be cut through and the tube replaced. Similar action may be taken when the catalyst requires to be replaced. There may be two aligned banks of the reformer tubes 8, one on each side of the horizontal headers, pipes 12, 13, 14, 15, these header pipes serving both banks.

In one case each reformer tube has an internal bore 4 in diameter and has an overall length of some 80 to 90 ft, of which the central portion, about 60 to 65 ft, is heated by hot helium supplied by the process heat exchangers 2 which are sited as shown in the reactor primary circuit. The reformer tubes are arranged vertically in banks, or rows being spaced on an 8 to 10 in pitch. A row will comprise some 600 tubes and it is necessary to provide two rows for a power absorption in the region of 250 MW(th). The reformer tubes are preferably suspended from a "key-hole" type support bracket, positioned at the upper end of the tube and a similar "key-hole" type guide, which allows free thermal expansion, is provided at the bottom end of the tube. It has been assumed that the nuclear reactor produces some 3,000 MW of heat and that about half of this power is used to drive the reformer and the remainder is used to produce steam for electrical generation. The 1,500 MW of process heat is transferred to the secondary helium circuit in 6 × 250 MW(t) process heat exchangers. Each of the process heat exchangers feeds a reformer tube modular arrangement in which there are six reformer circuits one for each heat exchanger 2.

We claim:

1. A process plant for performing high temperature endothermic reactions with the aid of a distributed catalyst and having a high temperature gas cooled nuclear reactor as a heat source, the plant comprising at least one bank of parallel, unidirectional-flow, process tubes, each tube defining therewithin a reaction zone, conduits for hot gas coaxially surrounding the process tubes to supply heat to the reaction zones, each said conduit being associated with one only of said process tubes, a first pair of header pipes, one header pipe of said first pair connected to supply reactants to one end of each of the process tubes, the other header pipe of said first pair connected to receive reaction products from the other end of each of the process tubes and a second pair of header pipes connected to supply heating gas to one end of each of the conduits and to receive said gas from the other end of each of the conduits 2. A process plant as claimed in claim 1 in which each of the process tubes has tube walls with a plurality of axially extending conduits formed therein for heating gas.

3. A process plant as claimed in claim 1 including means for supporting catalyst material within the process tubes.

4. A process plant as claimed in claim 3 in which each process tubes and its associated heating gas conduits are connected at their respective ends to said header pipes by flexible pipes which are sealable by crushing so as to isolate the tube and conduits from the header pipes.

5. A process plant as claimed in claim 1 in which the process tubes are arranged within co-axial conduits for heating gas and the header pipes are arranged with their axes perpendicular to the axes of the process tubes, the connections between header pipes and process tubes being such that reactants and heating gas pass in counter current flow.

6. A process plant as claimed in claim 3 further comprising sealable connector means for respectively connecting said process tubes and said conduits to said header pipes and for, when sealed, isolating said tubes and conduits from said header pipes.

* * * * *